US012768748B2

(12) United States Patent
Simard et al.

(10) Patent No.: US 12,768,748 B2
(45) Date of Patent: Oct. 20, 2026

(54) CHARACTERIZING OPTICAL STRUCTURES BASED ON OPTICAL CIRCUITS WITH DIFFERENT STRUCTURAL FEATURES

(71) Applicant: Ciena Corporation, Hanover, MD (US)

(72) Inventors: Alexandre D. Simard, Quebec (CA); Martin Caron, Québec (CA); Marie-Josee Picard, L'Ancienne-Lorette (CA); Keven Bedard, Québec (CA)

(73) Assignee: Ciena Corporation, Hanover, MD (US)

( * ) Notice: Subject to any disclaimer, the term of this patent is extended or adjusted under 35 U.S.C. 154(b) by 188 days.

(21) Appl. No.: 18/888,652

(22) Filed: Sep. 18, 2024

(65) Prior Publication Data

US 2026/0079077 A1 Mar. 19, 2026

(51) Int. Cl.
*G01M 11/00* (2006.01)
*G02B 6/126* (2006.01)

(52) U.S. Cl.
CPC ............. *G01M 11/33* (2013.01); *G02B 6/126* (2013.01)

(58) Field of Classification Search
CPC ......... G01M 11/33; G02B 6/126; G02B 6/00; G01B 9/02051
See application file for complete search history.

(56) References Cited

U.S. PATENT DOCUMENTS

2003/0223674 A1* 12/2003 Bell, Jr. ............. G01B 9/02051 385/15
2015/0338577 A1 11/2015 Shi et al.
2018/0059324 A1 3/2018 Tu et al.
2018/0231713 A1 8/2018 Picard
2020/0319409 A1 10/2020 Su et al.
2021/0018681 A1 1/2021 Picard et al.
(Continued)

FOREIGN PATENT DOCUMENTS

CN 110709866 A * 1/2020 ........... G06N 3/0442

OTHER PUBLICATIONS

H. Shu, B. Shen, Q. Deng, M. Jin, X. Wang and Z. Zhou, "A Design Guideline for Mode (DE) Multiplexer Based on Integrated Tapered Asymmetric Directional Coupler," in IEEE Photonics Journal, vol. 11, No. 5, pp. 1-12, Oct. 2019, Art No. 6603112, doi: 10.1109/JPHOT.2019.2941742.
(Continued)

*Primary Examiner* — Abdullahi Nur
(74) *Attorney, Agent, or Firm* — Young Basile Hanlon & MacFarlane. P.C.

(57) ABSTRACT

In one aspect, in general, a method comprises: providing optical waves to each of N optical circuits, each optical circuit comprising one or more of each of p structural features, where p is an integer greater than 1, and N is greater than or equal to p+1; measuring optical responses from each of the optical circuits, where each measured optical response depends at least in part on the optical wave provided to the respective optical circuit; and computing an optical loss associated with each of the p structural features based at least in part on an optical loss for each optical circuit that is calculated based at least in part on the optical wave provided to and the measured optical response from a respective optical circuit, and quantities of each of the p structural features in each of the respective optical circuits.

20 Claims, 9 Drawing Sheets

(56) References Cited

U.S. PATENT DOCUMENTS

| | | | | |
|---|---|---|---|---|
| 2021/0255058 | A1* | 8/2021 | Xu | G01M 11/33 |
| 2021/0341675 | A1 | 11/2021 | Su et al. | |
| 2022/0065743 | A1 | 3/2022 | Simard et al. | |

OTHER PUBLICATIONS

Wesley D. Sacher et al., "Polarization rotator-splitters in standard active silicon photonics platforms" Opt. Express, vol. 22, Iss. 4, pp. 3777-3786, Feb. 2014, DOI: 10.1364/OE.22.003777.

* cited by examiner

CHARACTERIZING OPTICAL STRUCTURES BASED ON OPTICAL CIRCUITS WITH DIFFERENT STRUCTURAL FEATURES

TECHNICAL FIELD

This disclosure relates to characterizing optical structures based on optical circuits with different structural features.

BACKGROUND

Chip-scale devices comprising integrated circuits (ICs) have applications ranging from electronics to optical connectivity. Increasing demand for integrated circuit devices has driven advancements in their operating capabilities, physical size, and reliability alongside optimizations in manufacturing processes including production and device testing. Some IC devices can comprise electronic components configured to manipulate or transmit electric signals while other IC devices can comprise photonic structures or components configured to guide or manipulate electromagnetic waves. Some IC devices can comprise optical waveguiding structures or optical circuits configured to guide optical waves in the optical wavelength region of the electromagnetic spectrum. Some electromagnetic waves have a spectrum that has a peak wavelength that falls in a particular range of optical wavelengths (e.g., between about 100 nm to about 1 mm, or some subrange thereof), also referred to as optical waves, light waves, or simply light. In some implementations, optical metrology techniques can be utilized to characterize operational capabilities or performance associated with an optical circuit. Such characterization can be a useful step in manufacturing and deploying an IC device.

SUMMARY

In one aspect, in general, a method comprises: providing optical waves to each of N optical circuits, each optical circuit comprising one or more of each of p structural features, where p is an integer greater than 1, and N is greater than or equal to p+1; measuring optical responses from each of the optical circuits, where each measured optical response depends at least in part on the optical wave provided to the respective optical circuit; and computing an optical loss associated with each of the p structural features based at least in part on an optical loss for each optical circuit that is calculated based at least in part on the optical wave provided to and the measured optical response from a respective optical circuit, and quantities of each of the p structural features in each of the respective optical circuits.

Aspects can include one or more of the following features.

Computing the optical loss comprises: arranging a first matrix comprising the measured optical losses from each of the optical circuits; arranging a second matrix comprising the quantity of each of the p structural features in each of the respective optical circuits; calculating an inverse of the second matrix; calculating a third matrix by multiplying the inverse of the second matrix with the first matrix; and determining the optical loss associated with each of the p structural features based at least in part on the third matrix.

The second matrix further comprises quantities associated with providing the optical waves to and measuring optical responses from each of the optical circuits.

The inverse of the second matrix is calculated using a pseudo-inverse or Moore-Penrose inverse.

The p structural features comprise one or more of: a length associated with an optical circuit or a quantity of bends associated with an optical circuit, a waveguide transition, an optical splitting structure, a polarization rotator splitters (PRS), a waveguide crossing, a phase shifter, or a tunable attenuator.

An optical wave is provided within each of the optical circuits to an optical structure configured to transform and to either separate or combine modes associated with the optical wave.

Calculating an optical loss for an optical circuit is based at least in part on two or more optical waves each having TE0 fundamental modes provided to the optical circuit.

Calculating an optical loss for an optical circuit is based at least in part on two or more optical waves provided to the optical circuit and two or more optical waves received from the optical circuit.

A first optical wave is provided to each optical circuit by a respective first optical coupler, a second optical wave is provided to each optical circuit by a respective second optical coupler, a third optical wave is received from each optical circuit by a respective third optical coupler, and a fourth optical wave is received from each optical circuit by a respective fourth optical coupler.

Calculating an optical loss for each optical circuit is based at least in part on comparing the first optical wave to the third optical wave, comparing the first optical wave to the fourth optical wave, comparing the second optical wave to the third optical wave, and comparing the second optical wave to the fourth optical wave.

Calculating an optical loss of an optical circuit is based at least in part on two or more optical waves having different respective fundamental modes provided to the optical circuit.

Calculating an optical loss of an optical circuit is based at least in part two or more spectral responses associated with an optical circuit.

In another aspect, in general, an article of manufacture comprises: at least two optical circuits, each optical circuit comprising a first optical structure configured to transform a mode associated with an optical wave propagating through the first optical structure and combine modes associated with respective optical waves propagating through the first optical structure, a second optical structure configured to separate modes associated with an optical wave propagating through the second optical structure and transform a mode associated with an optical wave propagating through the second optical structure, a first optical coupler and a second optical coupler connected to the first optical structure, a third optical coupler and a fourth optical coupler connected to the second optical structure, and a tested optical element that is coupled to the first optical structure and the second optical structure by a respective first coupling structure and a second coupling structure; wherein each tested optical element comprises one or more of each of two or more structural features, and respective quantities of at least two structural features are different within each optical circuit.

Aspects can include one or more of the following features.

The first coupling structure and the second coupling structure are each configured to generate a TE1 mode associated with an optical wave propagating through each of coupling structures.

The structural features comprise one or more of: a length associated with an optical waveguiding structure, a quantity of bends associated with an optical waveguiding structure, a waveguide transition, an optical splitting structure, a polarization controller, a phase shifter, or a tunable attenuator.

Each optical circuit further comprises a fifth optical coupler and a sixth optical coupler that are each coupled to the first coupling structure and the second coupling structure, respectively.

The first coupling structure and the second coupling structure are each configured as adiabatic couplers.

Each of the first optical coupler, the second optical coupler, the third optical coupler, and the fourth optical coupler are grating couplers.

The first optical structure is configured to transform a TE0 mode associated with an optical wave to a TM0 mode associated with an optical wave and combine a TE0 mode associated with an optical wave with a TM0 mode associated with an optical wave and the second optical structure is configured to separate a TE0 mode associated with an optical wave from a TM0 mode associated with an optical wave and transform a TM0 mode associated with an optical wave to a TE0 mode associated with an optical wave.

The first optical structure is configured to transform a TE0 mode associated with an optical wave to a higher-order TE mode associated with an optical wave and combine a TE0 mode associated with an optical wave with the higher-order TE mode associated with an optical wave and the second optical structure is configured to separate a TE0 mode associated with an optical wave from a higher-order TE mode associated with an optical wave and transform the higher-order TE mode associated with an optical wave to a TE0 mode associated with an optical wave.

Aspects can have one or more of the following advantages.

Some of the implementations disclosed herein can reduce resources associated with characterizing optical structures in photonic integrated circuits, including the physical space or "real estate" occupied by test circuits on an IC device. Some methods of testing optical circuits can also be associated with reduced characterization time. Some methods of testing optical circuits can also facilitate a comprehensive analysis of optical circuit behavior to be achieved, enabling a more accurate understanding of device performance. Further, some implementations described herein can simplify the characterization of more elaborate optical components by removing the necessity to create distinct processing steps. Some of the methods disclosed herein can be utilized to increase a measurement accuracy associated with characterizing photonic IC devices. In some implementations, the methods disclosed herein can be utilized to improve die yield from run to run.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
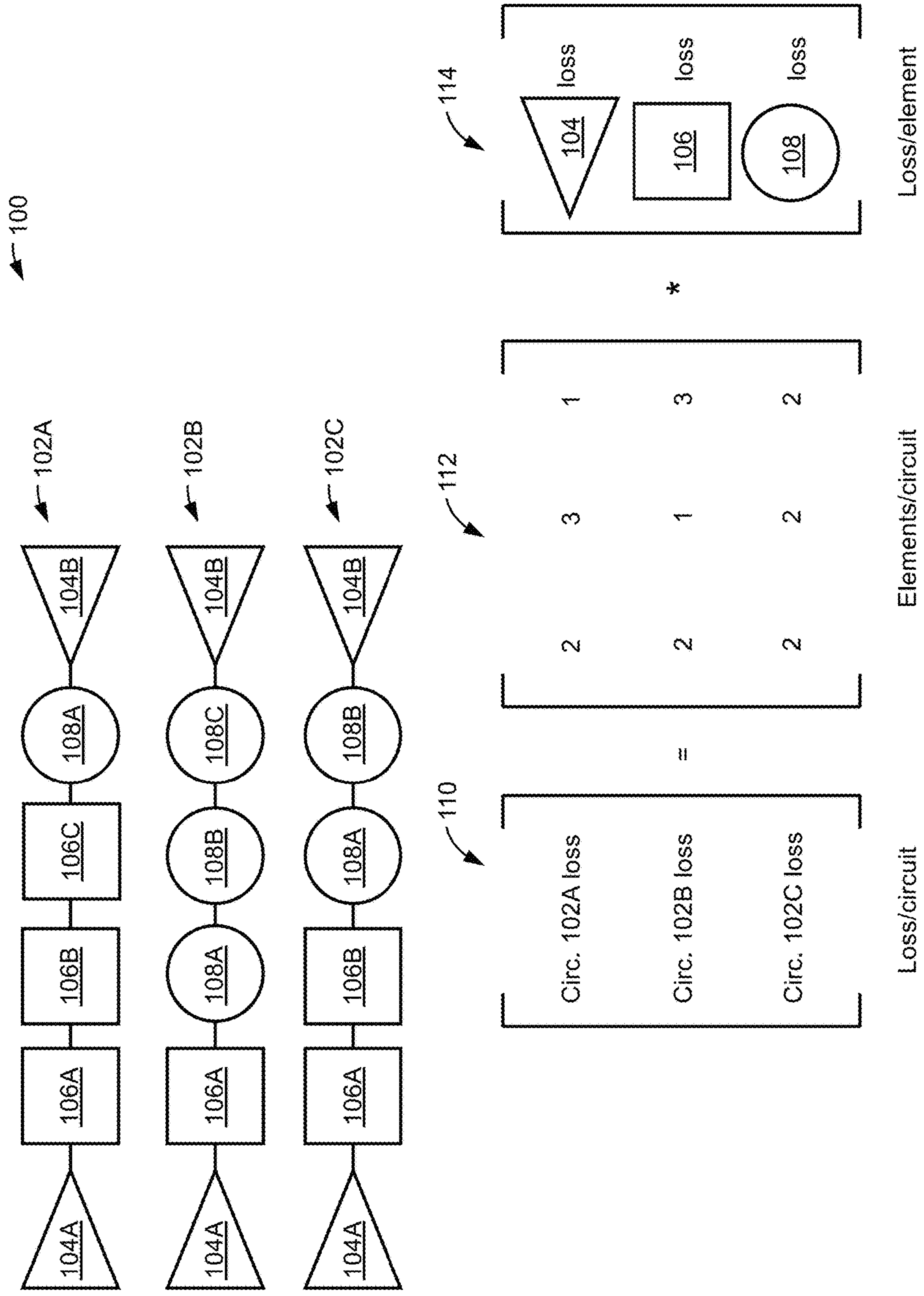
FIG. 1 is a schematic diagram of an example test configuration and an associated system of equations.

Some optical metrology implementations can comprise characterizing losses associated with an optical wave propagating through the circuit. Some optical circuits can comprise one or more of each of more than one structural feature. In some implementations, characterizing an optical circuit can comprise measuring each loss associated a respective structural feature. Some methods of characterizing optical circuits can comprise utilizing a plurality of test structures in order to measure each loss associated with a respective structural feature.

Some methods of measuring losses associated with optical waves propagating through structural features can comprise processing several test circuits as a whole rather than splitting them into separate design of experiments (DOE). Such methods can comprise arranging a test configuration comprising several optical circuits, where each optical circuit comprises some combination of structural features. Optical waves can then be provided to each optical circuit and the respective optical response of the optical circuit can be measured. An optical loss associated with each optical circuit can be calculated based at least in part on the optical wave provided to and the measured optical response from a respective optical circuit. Measuring the optical wave provided to and the measured optical response can be used to reconstruct the scattering matrix or S-matrix associated with structural features of an optical circuit. In some implementations, an optical loss associated with each structural feature can be determined using a system of equations in which the structural features treated as the "unknowns" of a linear system while the test circuits themselves are the "equations" to be solved. In some system of equations, the optical losses can be in logarithmic form such that the system of equations is linear.

In some implementations, the system of equations can assume the form $$OL = \underbrace{\begin{pmatrix} & \cdots & \\ \vdots & \ddots & \vdots \\ & \cdots & \end{pmatrix}}_{M} F, \tag{1}$$

where OL is a matrix comprising the measured optical loss of each optical circuit, F is a matrix comprising optical losses associated with each structural feature, and M is a matrix that comprising the number of structural features associated with each optical circuit. In some implementations, OL and F are matrices with one column, or vectors. The rows of the matrix M comprise each structural feature in a respective optical circuit whereas the columns are the number of iterations of each structural feature or subcomponent in the ensemble of optical circuits. In some examples, the matrix F can be calculated by taking an inverse of the matrix M and multiplying the inverse with the matrix OL. In some implementations, a matrix M can comprise a number of rows and a number of columns that are equal such that M is square and invertible. In some implementations, a matrix M can have a nonequal number of rows and number of columns such that the M is non-square and non-invertible. In such examples, a pseudo-inverse or Moore-Penrose inverse of the matrix M can be calculated to calculate F.

FIG. 1 depicts an example test configuration 100 (e.g., implemented in an article of manufacture as summarized above) comprising optical circuits 102A-102C and a system of equations associated with the test configuration 100 comprising vectors 110, 114 and matrix 112 associated with characterizing optical losses of the optical circuits. Each optical circuit 102A-102C comprises optical couplers 104A and 104B and one or more of each of structural features 106, 108. Optical waves can be provided to each optical circuit 102A-102C at optical coupler 104A and an associated optical response can be measured at optical coupler 104B. The optical loss can be calculated based at least in part on the optical wave provided to and the measured optical response from a respective optical circuit 102A-102C. The vector 110 comprises elements associated with the optical loss measured through each optical circuit 102A-102B between respective optical couplers 104A and 104B. The matrix 112 comprises elements associated with the optical couplers 104 and the structural features 106, 108 in each optical circuit 102A-102C. Each row of matrix 112 comprises the number of optical couplers 104 and structural features 106, 108 in a respective optical circuit 102A-102C. Each column of matrix 112 comprises the total number of structural features in the optical circuits 102A-102C. The vector 114 comprises elements associated with the optical loss of with each optical coupler 104 and structural feature 106, 108. Referring back to eq. 1, the system of equations associated with the test configuration 100 including vectors 110, 114 and matrix 112 is:

$$\begin{bmatrix} Circ.\,102A\text{ loss} \\ Circ.\,102B\text{ loss} \\ Circ.\,102C\text{ loss} \end{bmatrix} = \begin{bmatrix} 2 & 3 & 1 \\ 2 & 1 & 3 \\ 2 & 2 & 2 \end{bmatrix} \begin{bmatrix} \text{Optical coupler 104 loss} \\ \text{Feature 106 loss} \\ \text{Feature 108 loss} \end{bmatrix}. \tag{2}$$

This system of equations can be utilized to compute an optical loss associated with each structural feature 106, 108.

In some implementations, the optical couplers 104A and 104B can be grating couplers configured to couple a free-space optical wave into an optical circuit or emit an optical wave into free space from an optical circuit. In such implementations, incorporating features into optical circuits such that the respective values in the M matrix are larger than the grating couplers and measurement precision can be helpful in minimizing errors associated with characterization. In some implementations, the optical couplers 104A and 104B can be edge couplers.

Some grating couplers can be wavelength dependent. In some implementations, an OL vector can be determined by capturing the peak spectral response of each optical circuit. This approach can yield scalar information for each fundamental element. In some implementations, wavelength-dependent responses can be characterized to obtain a more in-depth understanding of an optical circuit. In some implementations, different respective systems of equations can be constructed and solved for each wavelength in a range of wavelengths. In some implementations, the wavelength dependent responses can be added as a third dimension to each respective matrix in the system of equations. Some implementations can lead to errors in the spectral response of the loss elements due to the wavelength dependency of a grating coupler. In some implementations, a grating coupler can be de-embedded and removed from the equation to reduce errors associated with the characterization.

Figure 2:
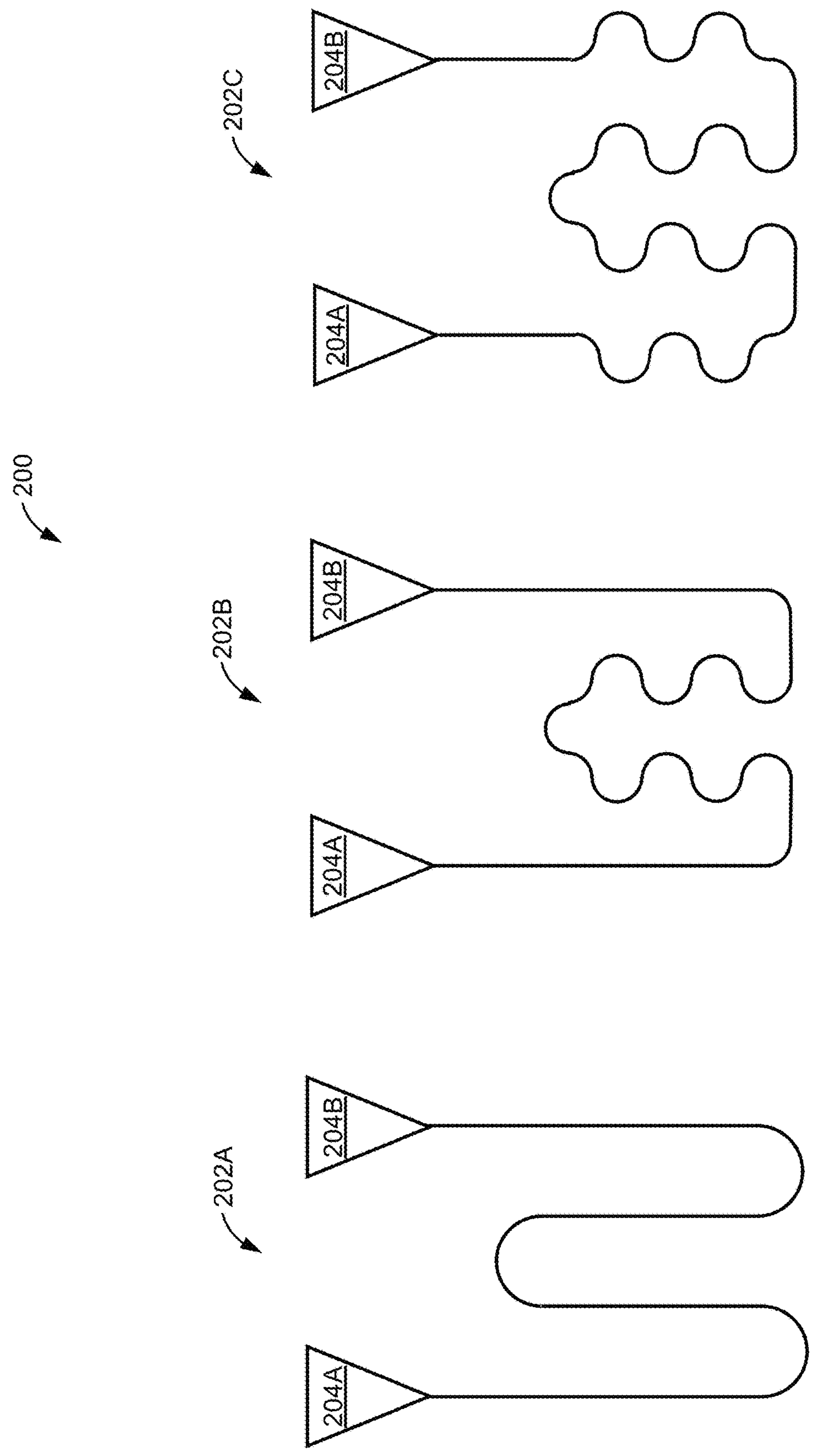
FIG. 2 is a schematic diagram of example optical circuits comprising waveguides.

An example test configuration 200 is depicted in FIG. 2. The example test configuration 200 comprises optical circuits 202A-202C. Each optical circuit 202A-202C comprises optical coupler 204A and 204B. Each optical circuit 202A-202C comprises a waveguide having a length and a number of bends. An example system of equations that corresponds to the test configuration 200 is:

$$\begin{bmatrix} Circ.\,202A\text{ loss (dB)} \\ Circ.\,202B\text{ loss (dB)} \\ Circ.\,202C\text{ loss (dB)} \end{bmatrix} = \begin{bmatrix} 2 & 1\text{ mm} & 6 \\ 2 & 0.75\text{ mm} & 22 \\ 2 & 0.5\text{ mm} & 38 \end{bmatrix} \begin{bmatrix} \text{Optical coupler 204 loss (dB)} \\ \text{Waveguide length loss (dB/mm)} \\ \text{Bend loss (dB/bend)} \end{bmatrix}. \tag{2}$$

Figure 3:
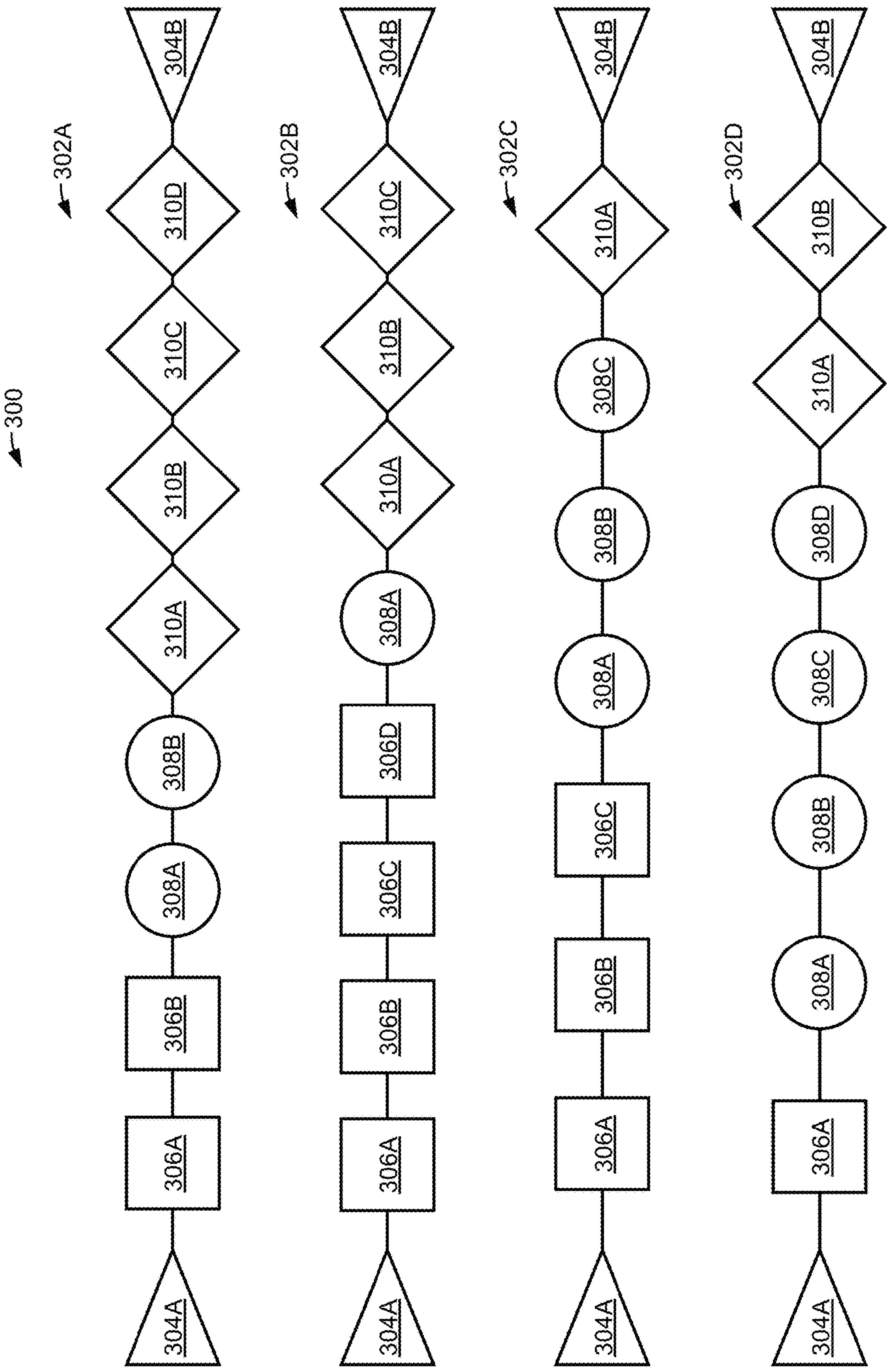
FIG. 3 is a schematic diagram of an example test configuration for characterizing structural features.

In the example test configuration 100, three optical circuits are utilized to characterize the two structural features 106, 108. Some optical circuits can comprise more than two structural features. FIG. 3 depicts an example test configuration 300 comprising optical circuits 302A-302D. Each optical circuit 302A-302D comprises optical couplers 304A and 304B and one or more of each of three structural features 306, 308, 310. Optical waves can be provided to each optical circuit 302A-302D at optical coupler 304A and an associated optical response can be measured at optical coupler 304B. The system of equations that can be utilized to compute an optical loss associated with each structural feature 306, 308, 310 is:

$$\begin{bmatrix} Circ.\,302A\text{ loss} \\ Circ.\,302B\text{ loss} \\ Circ.\,302C\text{ loss} \\ Circ.\,302D\text{ loss} \end{bmatrix} = \begin{bmatrix} 2 & 2 & 2 & 4 \\ 2 & 4 & 1 & 3 \\ 2 & 3 & 3 & 1 \\ 2 & 1 & 4 & 2 \end{bmatrix} \begin{bmatrix} \text{Optical coupler 304 loss} \\ \text{Feature 306 loss} \\ \text{Feature 308 loss} \\ \text{Feature 310 loss} \end{bmatrix}. \tag{3}$$

In general, for N optical circuits, where each optical circuit comprises one or more of p structural features, and where p is an integer greater than 1, the number of optical circuits that can be utilized to characterize the structural features is N=p+1. In some implementations, a test configuration to characterize structural features can comprise optical circuits where each optical circuit comprises one or more of each of two or more structural features, and respective quantities of at least two structural features that are different within each optical circuit.

In some implementations, additional optical circuits can be included in a test configuration to provide redundancy in case of missing measurements or a local error on a die, such as a broken waveguide due to process deviation. For instance, for a test configuration comprising 4 optical circuits and 2 structural features, the system of equations to compute the an optical loss associated with each structure feature can assume the form:

$$\begin{bmatrix} Circ.\,1\text{ loss} \\ Circ.\,2\text{ loss} \\ Circ.\,3\text{ loss} \\ Circ.\,4\text{ loss} \end{bmatrix} = \begin{bmatrix} 2 & X & Y \\ 2 & X & Y \\ 2 & X & Y \\ 2 & X & Y \end{bmatrix} \begin{bmatrix} \text{Optical coupler loss} \\ \text{Feature 1 loss} \\ \text{Feature 2 loss} \end{bmatrix}, \tag{4}$$

where X and Y represent the number of each of the structural features in each optical circuit.

In some implementations, this metrology strategy can offer a generalized framework for processing optical circuits and delivering the fundamental response of optical components. This framework can allow the reduction of real estate occupied by such metrology structures in an IC device. In some implementations, the metrology strategy can also reduce the impact of variability introduced by the components that couple light into the integrated circuits, e.g., grating couplers, giving designers greater control over the precision of tests. In addition, in some examples, this strategy can also simplify the characterization of more elaborate optical components by removing the necessity to create distinct processing steps.

In some examples, as optical circuits are added to a test configuration, M can be degenerate or rank deficient. Some implementations can comprise designing optical circuits to include in the test configuration such that each structural feature can be optically characterized.

Some optical circuits can comprise combinations of multiple structural features. Without intending to be comprehensive, structural features can include waveguides, bent waveguides, waveguide transitions, splitters, polarization controllers, polarization rotator splitters (PRS), phase shifters, waveguide crossings, and tunable attenuators.

In some optical circuits, one or more of the optical couplers can be replaced with a photodiode such that loss associated with each structural feature can be optically characterized. In such implementations, the optical coupler loss in the matrix can be associated with a station loss associated with measuring optical signals using the photodiodes.

Figure 4:
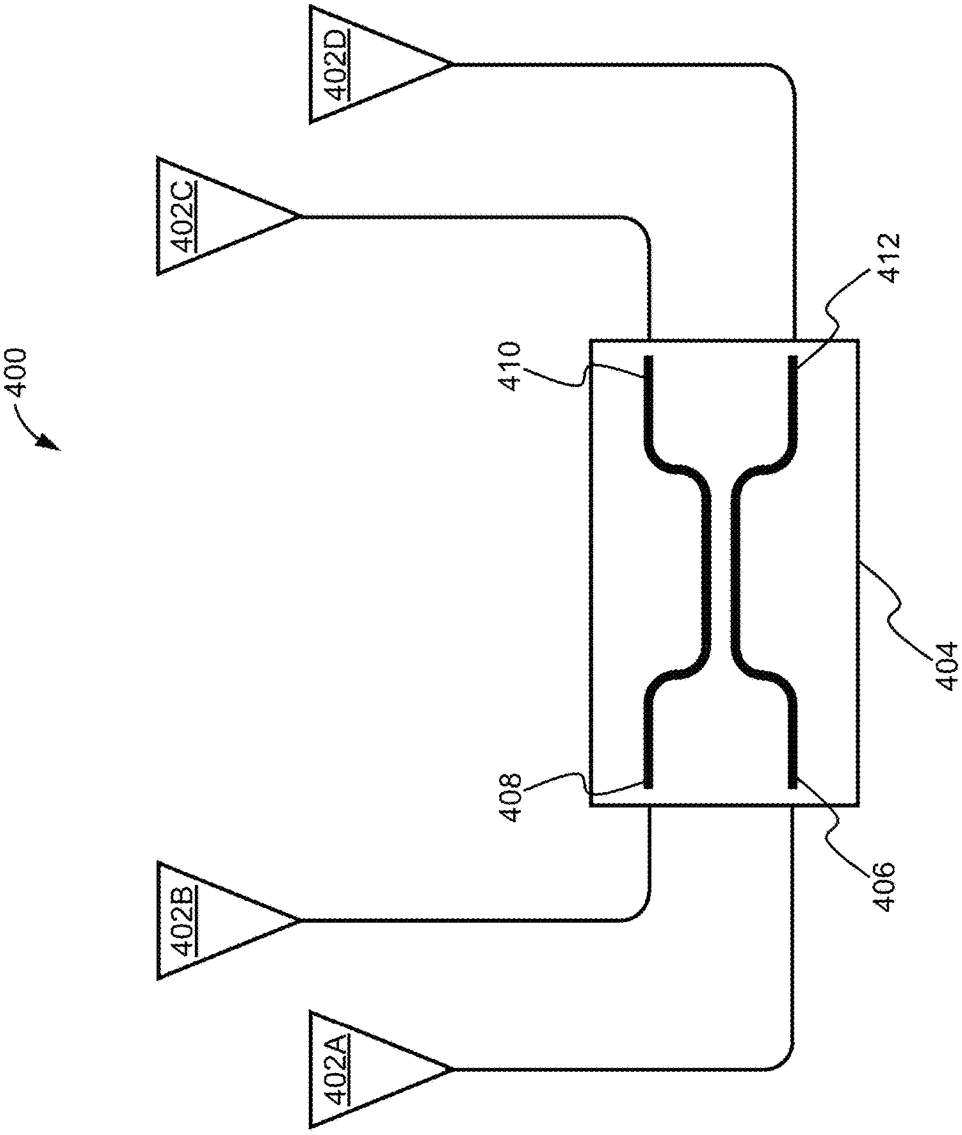
FIG. 4 is a schematic diagram of an example optical circuit comprising a coupler structure.

Some optical circuits can comprise structural features comprising several input/output ports. For instance, some optical circuits can comprise a 2×2 coupler that is configured to accept two optical wave and produce two optical waves. FIG. 4 depicts an example optical circuit 400 comprising couplers 402A-402D connected to a 2×2 coupler 404. The 2×2 coupler 404 comprises an input port 406, an input port 408, an output port 410, and an output port 412. Characterization of the device 404 can comprise measuring the optical loss between multiple pairs of couplers 402A-402D. An example system of equations for this optical circuit could comprise:

$$\begin{bmatrix} \text{Coupler } 402B - 402C \text{ loss} \\ \text{Coupler } 402B - 402D \text{ loss} \\ \text{Coupler } 402A - 402D \text{ loss} \\ \text{Coupler } 402A - 402C \text{ loss} \end{bmatrix} = \begin{bmatrix} 2 & 1 & 0 & 0 & 0 \\ 2 & 0 & 1 & 0 & 0 \\ 2 & 0 & 0 & 1 & 0 \\ 2 & 0 & 0 & 0 & 1 \end{bmatrix} \begin{bmatrix} \text{Coupler } 402A - 402D \text{ loss} \\ \text{Ports } 408 - 410 \text{ loss} \\ \text{Ports } 408 - 412 \text{ loss} \\ \text{Ports } 406 - 412 \text{ loss} \\ \text{Ports } 406 - 410 \text{ loss} \end{bmatrix}. \tag{4}$$

Characterizing a multiport structural feature using this characterization technique can allow for the resolution of individual scattering matrix elements. Additionally, this technique facilitates automatic de-embedding of the routing elements such that the effects of interconnected routing elements of the circuit can be removed. This method can also be utilized for various other multiport structural features, such as 1×2, 1×4, 1×8, 1×16, 2×4 etc. couplers. Other optical circuits could also be measured with the circuit 400 to characterize losses associated with bends or the length of the waveguides. In such examples, the matrices representing the system of equations can be expanded to include other optical circuits and structural features. In some examples, other optical circuits can be added to fully characterize losses associated with each structural feature.

This linear system solving approach can be effective in cases where "well-behaved" structural features are involved, i.e. structural features having low reflection and mono-mode behavior. In some implementations, multi-path interference or non-linear optical responses, such as interference patterns, can interfere with device characterization. Using the linear system solving approach can allow for the isolation of these interferometric responses and can provide base elements to allow circuit fitting optimization. For example, if the circuit 400 contained a Mach-Zehnder interferometer (MZI) as the structural feature 404, the MZI can be considered as a distinct unknown, and not the summation of two couplers and waveguides. The system of equations could then comprise:

$$\begin{bmatrix} \text{Path } 402B - 402C \text{ loss} \\ \text{Path } 402B - 402D \text{ loss} \\ \text{Path } 402A - 402D \text{ loss} \\ \text{Path } 402A - 402C \text{ loss} \\ MZI \end{bmatrix} = \begin{bmatrix} 2 & 1 & 0 & 0 & 0 & 0 \\ 2 & 0 & 1 & 0 & 0 & 0 \\ 2 & 0 & 0 & 1 & 0 & 0 \\ 2 & 0 & 0 & 0 & 1 & 0 \\ 2 & 0 & 0 & 0 & 0 & 1 \end{bmatrix} \begin{bmatrix} \text{Coupler } 402A - 402D \text{ loss} \\ \text{Ports } 408 - 410 \text{ loss} \\ \text{Ports } 408 - 412 \text{ loss} \\ \text{Ports } 406 - 412 \text{ loss} \\ \text{Ports } 406 - 410 \text{ loss} \\ MZI \text{ Ports } 406 - 412 \text{ loss} \end{bmatrix}. \tag{4}$$

Once the matrix is solved, the losses associated with the coupler and waveguides can be used to reconstruct the interferometer using circuit simulations. While the system of equations includes one combination of ports, other system of equations can include other combinations of ports. In this subsequent data processing, the optical phase difference can be optimized to match the spectral response of the MZI. If the individual elements cannot be characterized as a stand-alone structure, the interferometer analysis can be used to optimize the full scattering matrix of sub-elements. Some MZIs can have a nonlinear response between multiple ports such that more complex data processing and circuit simulations are necessary to characterize the MZI.

Some IC devices are configured to utilize optical waves having one fundamental mode. For instance, some silicon photonic platforms used in telecommunication applications utilize a TE fundamental mode. In such platforms, components can be designed for operation in this mode. In some implementations, fabrication defects and bias can bring partial excitation of other supported modes in a waveguide or other structural features. These modes are sometimes referred to as "parasitic modes." Some IC devices can comprise mode filters to remove these parasitic modes. In some implementations, parasitic mode absorption can be quantified by computational techniques including finite-difference time-domain (FDTD) and/or eigenmode expansion (EME) methods.

Some optical circuits can include one or more mode filters to characterize the fundamental modes of optical waves propagating through the optical circuit. In some implementations, a mode filter can comprise a polarization rotator splitter (PRS), or an optical structure configured to transform modes associated with an optical wave propagating through the structure and separate modes associated with an optical wave propagating through the optical structure. In some implementations, a PRS can comprise two input ports and one output port and can configured to transform an input TM0 mode into a TE0 mode while allowing an input TE0 mode to remain unchanged.

Figure 5:
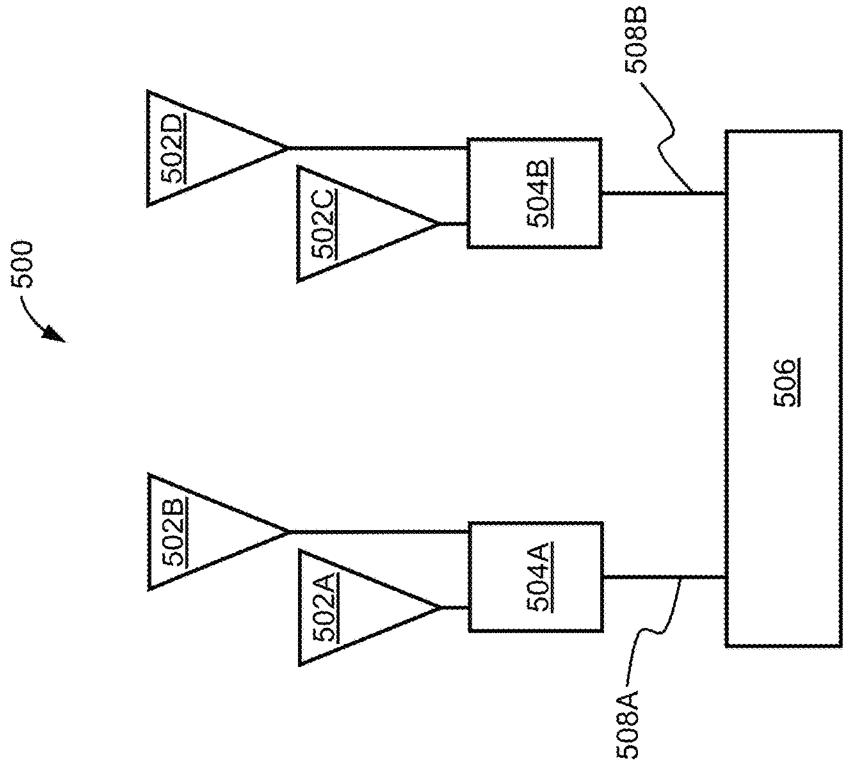
FIG. 5 is a schematic diagram of an example optical circuit.

Some optical circuits can include two mode filters that are each connected to a tested optical element comprising multiple structural features. FIG. 5 depicts an example optical circuit 500 comprising a first optical coupler 502A and a second optical coupler 502B connected to a first optical structure 504A, and a third optical coupler 502C and a fourth optical coupler 502D connected to a second optical structure 504B. The first optical structure 504A is configured to transform a mode associated with an optical wave propagating through the first optical coupler 502A and combine the transformed mode with a mode associated with an optical wave propagating through the second optical coupler 502B. The optical circuit 500 also comprises a second optical structure 504B configured to transform a mode associated with an optical wave propagating through the third optical coupler 502C and separate a mode associated with an optical wave propagating through the fourth optical coupler 502D. The first optical structure 504A and the second optical structure 504B are each coupled to a tested element 506 by a respective coupling structure 508A and coupling structure 508B. In some implementations, the coupling structure 508A and the coupling structure 508B are both optical waveguides. The propagation of optical waves having different fundamental modes through tested element 506 can be characterized by coupling an optical wave into two optical couplers and measuring some combination of the optical couplers. For instance, an optical wave having a TE0 mode can be coupled into the first optical coupler 502A and an optical wave having a TE0 mode can be coupled into the second optical coupler 502B. The output of the first optical structure 504A can be an optical wave having a TM0 mode and an optical wave having a TE0 mode. An output response from the fourth optical coupler 502D can be measured relative to the optical wave coupled into the first optical coupler 502A to characterize the fundamental TE0 mode propagating through the tested element 506. An output response from the third optical coupler 504C can be measured relative to the optical wave coupled into the second optical coupler 504B to characterize the fundamental TM0 mode propagating through the tested element 506. In some implementations, the modal extinction ratio of the tested element 506 can also be characterized by measuring the optical response from the third optical coupler 502C and the fourth optical coupler 502D relative to the optical wave coupled into the first optical coupler 502A as well as measuring the optical response from the third optical coupler 502C and the fourth optical coupler 502D relative to the optical wave coupled into the second optical coupler 502B.

In some optical circuits, the first optical structure 504A and the second optical structure 504B can be PRSs. In some examples, the S-matrix of a single PRS can be extracted from the optical responses of the circuit 500. Such implementations can comprise processing a linear matrix to de-embed the routing waveguide between the optical couplers and the two PRSs. The response of the two PRSs can then be analyzed to isolate them from the response of the optical circuit. In some examples, the responses of the two PRSs can be assumed to be the same, as the two PRSs can be located in close proximity. A circuit simulation of the global optical response can be fitted with the PRS response as the unknown.

In some implementations, the first optical structure 504A and the second optical structure 504B each be configured to transform an either combine or separate optical waves having higher-order modes than TM0, such as TEx or TMx, where x is an integer.

Figure 6:
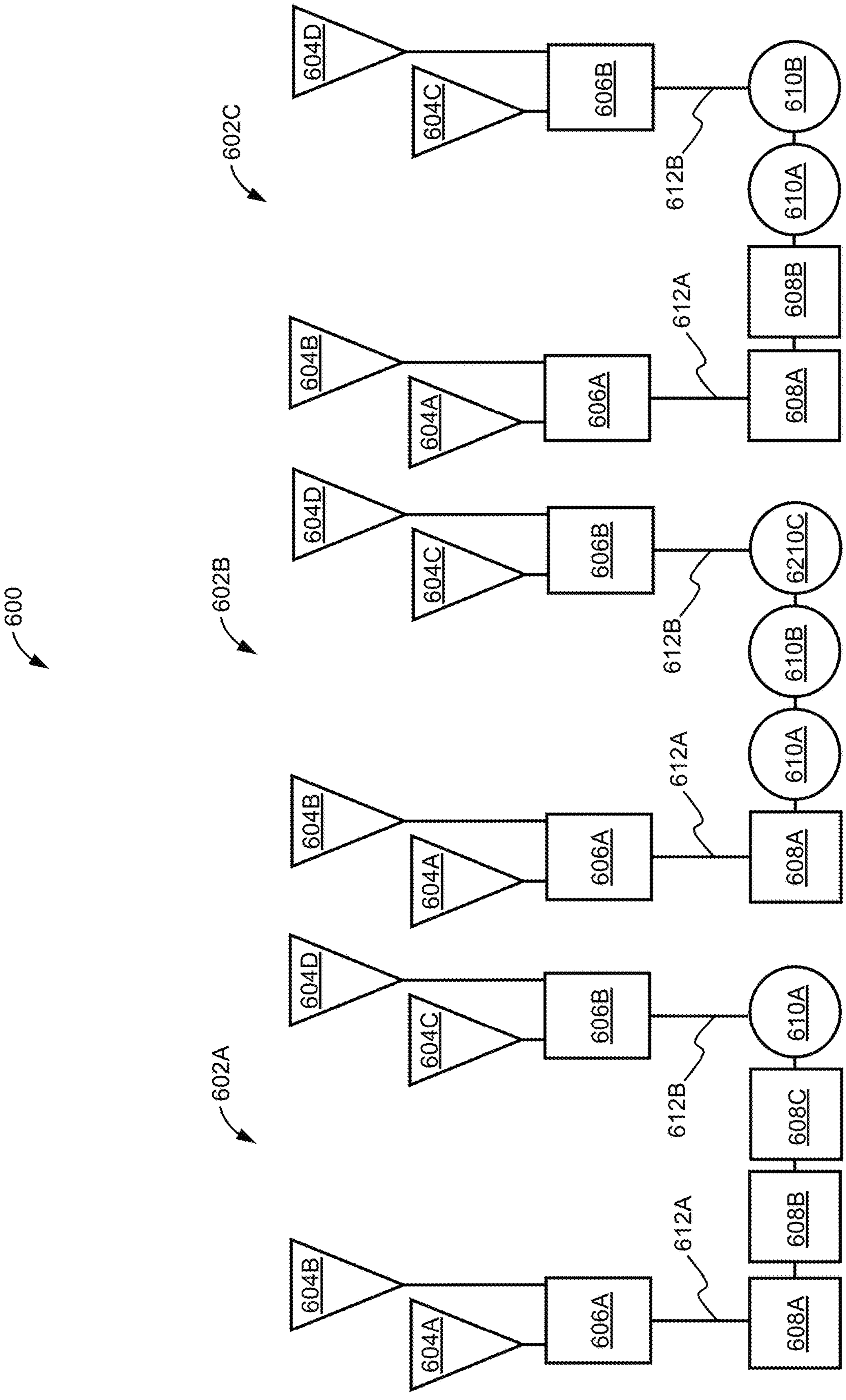
FIG. 6 is a schematic diagram of example optical circuits comprising structural features.

Some tested optical elements can comprise one or more of each of two or more structural features. FIG. 6 depicts an example test configuration 600 comprising optical circuits 602A-602C. Each optical circuit 602A-602C comprises a first optical coupler 604A and a second optical coupler 604B that are each connected to a first optical structure 606A configured to transform a mode associated with an optical wave propagating through the first optical coupler 604A and combine the transformed mode with a mode associated with an optical wave propagating through the second optical coupler 604B. Each optical circuit 602A-602C also comprises a third optical coupler 604C and a fourth optical coupler 604D that are each connected to a second optical structure 606B configured to transform a mode associated with an optical wave propagating through the third optical coupler 604C and separate a mode associated with an optical wave propagating through the fourth optical coupler 604D. Each of the first optical structure 606A and the second optical structure 606B are coupled to a tested element by a respective coupling structure 612A and coupling structure 612B. In some implementations, each of the coupling structure 612A and the coupling structure 612B can be optical waveguides. Each tested optical element comprises one or more of each of two or more structural features 608 and 610. The respective quantities of at least two structural features 608 and 610 are different in each optical circuit 602A-602C.

Figure 7:
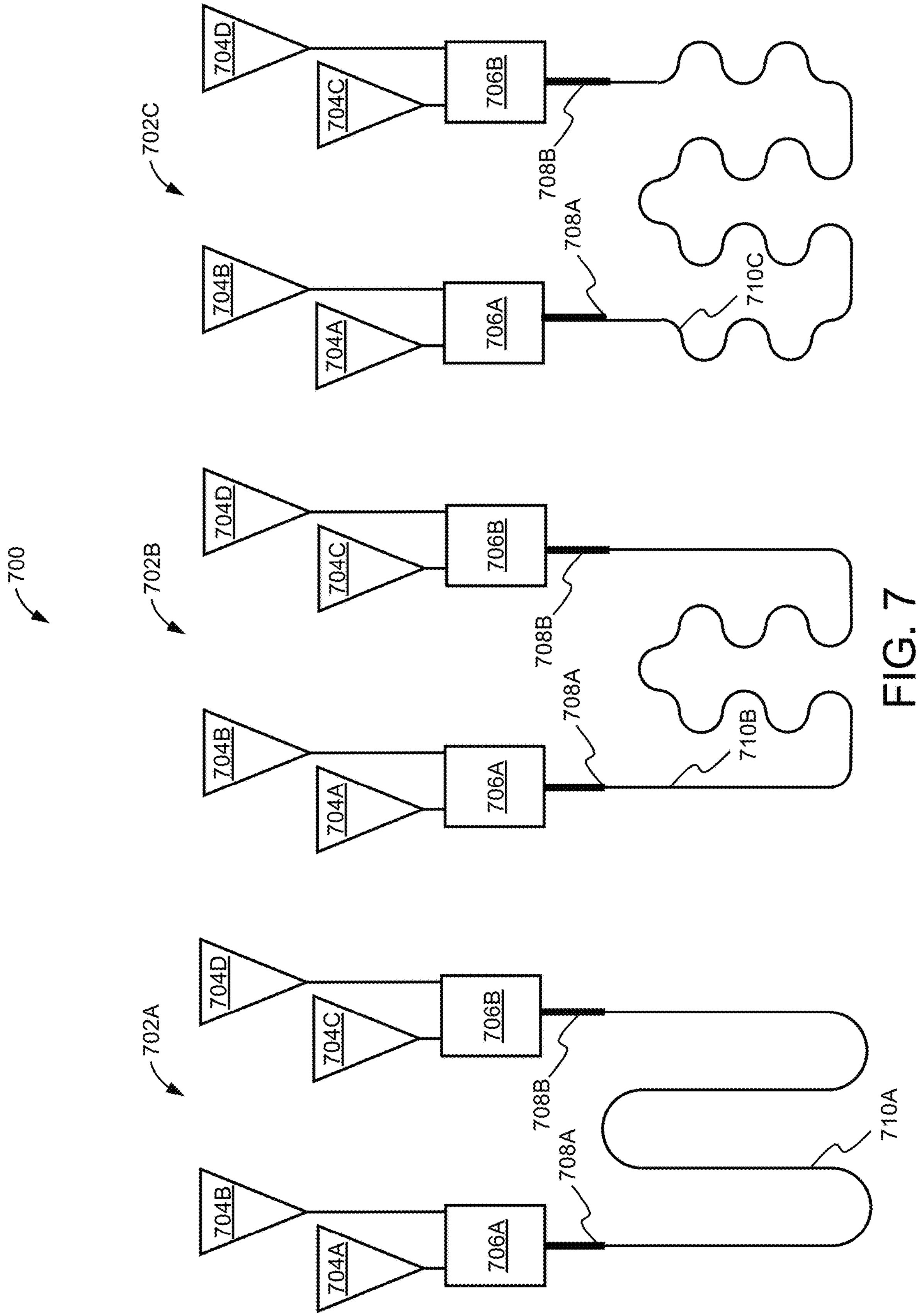
FIG. 7 is a schematic diagram of example optical circuits comprising waveguides.

FIG. 7 depicts an example test configuration 700 comprising optical circuits 702A-702C. Each optical circuit 702A-702C comprises a first optical coupler 704A and a second optical coupler 704B that are each connected to a first optical structure 706A configured to transform a mode associated with an optical wave propagating through the first optical coupler 704A and combine the transformed mode with a mode associated with an optical wave propagating through the second optical coupler 704B. Each optical circuit 702A-702C also comprises a third optical coupler 704C and a fourth optical coupler 704D that are each connected to a second optical structure 706B configured to transform a mode associated with an optical wave propagating through the third optical coupler 704C and separate a mode associated with an optical wave propagating through the fourth optical coupler 704D. Each optical circuit 702A-702C further comprises a respective tested optical element 710A-710C. Each tested optical element 710A-710C is connected to the first optical structure 706A by a coupling structure 708A and to the second optical structure 706B by a coupling structure 708B. Each tested optical element comprises a respective waveguide having a length and a quantity of bends. The respective waveguide lengths and quantity of bends are different in each optical circuit 702A-702C.

Some coupling structures can be configured to generate a TE1 mode associated with an optical wave propagating through each of the coupling structures. In implementations utilizing these coupling structures, losses of optical waves propagating through a tested element can be utilized to characterize the tested element as previously described. Some coupling structures can generate a TE1 mode from a TM0 mode using a bilevel taper structure comprising a waveguide having a thickness on top of a partially etched slab having a smaller thickness.

Figure 8:
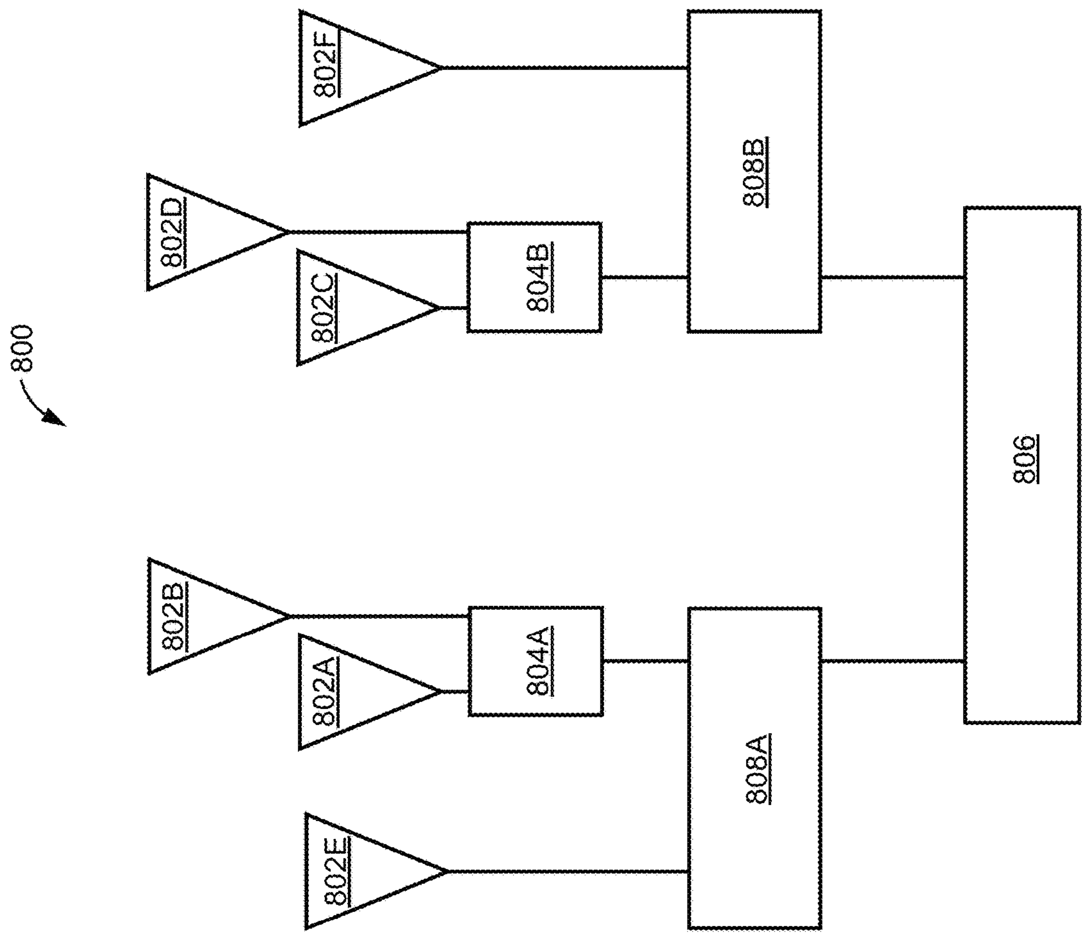
FIG. 8 is a schematic diagram of an example optical circuit.

In some implementations, optical circuits in a test configuration can be configured such that optical waves having TE0, TM0, and TE1 modes can be provided to a tested element to characterize the response of the tested element to each of the modes. FIG. 8 depicts an example optical circuit 800 comprising a first optical coupler 804A and a second optical coupler 804B that are each connected to a first optical structure 804A that is configured to transform a mode associated with an optical wave propagating through the first optical coupler 804A and combine with a mode associated with an optical wave propagating through the second optical coupler 804B. In some implementations, TE0 modes can be provided to the first optical coupler 804A and the second optical coupler 804B such that the first optical structure 804A can provide TE0 and TM0 modes to a tested optical element 806. The optical circuit 800 also comprises a third optical coupler 802C and a fourth optical coupler 802D that are each connected to a second optical structure 804B that is configured to transform a mode associated with an optical wave propagating through the third optical coupler 804C and separate a mode associated with an optical wave propagating through the fourth optical coupler 804D. The optical circuit also comprises a tested optical element 806 that is connected to the first optical structure 804A by a coupling structure 808A and to the second optical structure 804B by a coupling structure 808B. The optical circuit 800 further comprises a fifth optical coupler 802E that is coupled to the coupling structure 808A and a sixth optical coupler 802F that is coupled to the coupling structure 808B. The coupling structure 808A is configured to combine the TM0 and TE0 modes from the output of the first optical structure 804A with a TE1 mode coming from the transformation of a TE0 mode coupled into the fifth optical coupler 802E. The coupling structure 808B is configured to separate each of the TM0, TE0, and TE1 modes from the output of the tested element 806 to the respective third optical coupler 802C, the fourth optical coupler 802D, and the sixth optical coupler 802F. In this implementation, the coupling structure 808A and the coupling structure 808B are each an adiabatic coupler.

In some implementations, the optical circuit 800 can be generalized such that the coupling structure 808A and the coupling structure 808B are each configured as a complex n×n structure such that multiple modes provided to respective optical couplers can be tested in parallel. This configuration can be helpful for characterizing rib waveguide structures that can support several slab modes.

Figure 9:
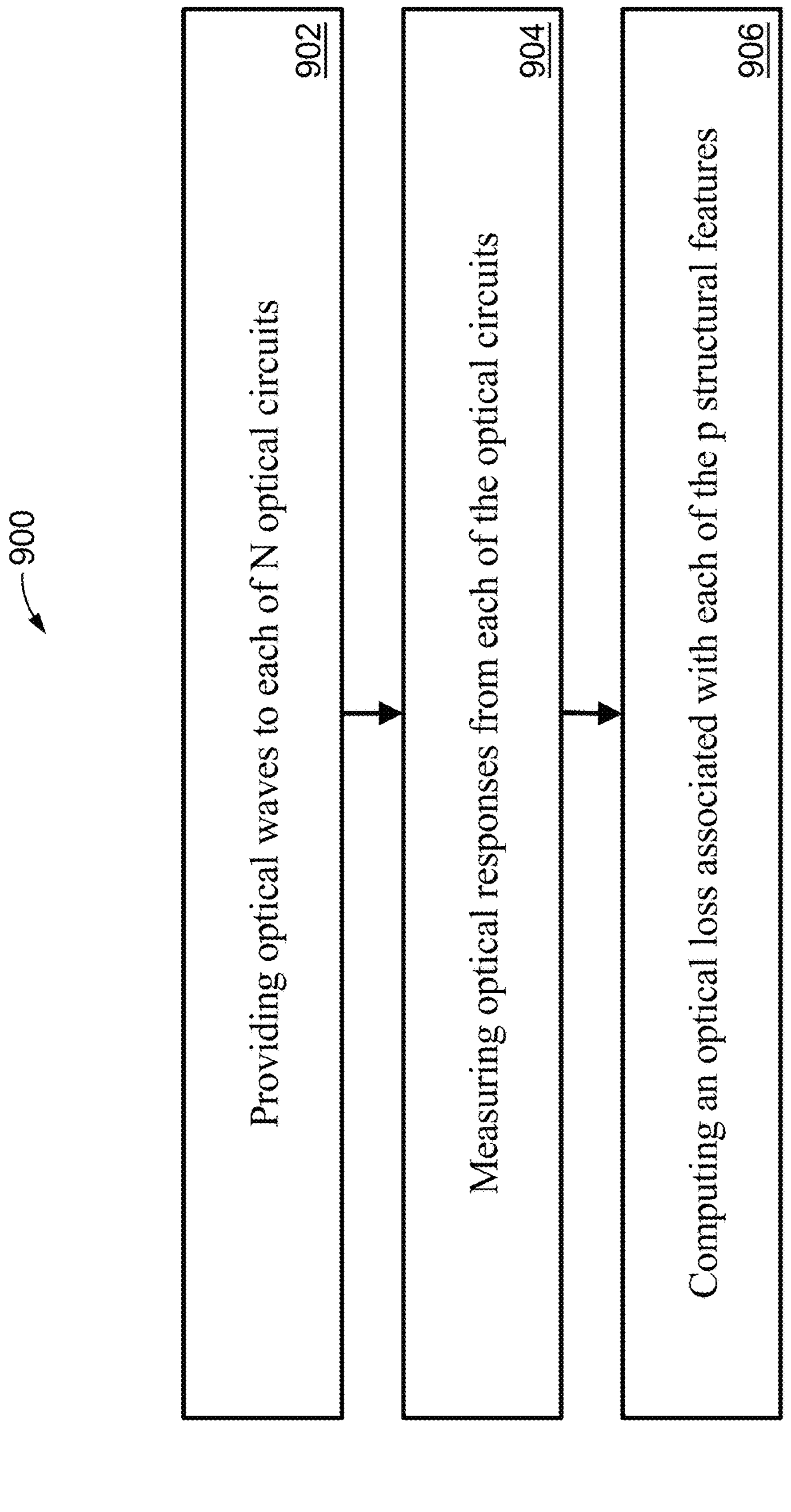
FIG. 9 is a flowchart depicting an example method of utilizing a test configuration.

FIG. 9 depicts a flowchart of an example method for utilizing a test configuration to measure optical losses associated with structural features. The method comprises providing 902 optical waves to each of N optical circuits, each optical circuit comprising one or more of each of p structural features, where p is an integer greater than 1, and N is greater than or equal to p+1. The method also comprises measuring 904 optical responses from each of the optical circuits, where each measured optical response depends at least in part on the optical wave provided to the respective optical circuit, and computing 906 an optical loss associated with each of the p structural features based at least in part on an optical loss for each optical circuit that is calculated based at least in part on the optical wave provided to and the measured optical response from a respective optical circuit, and quantities of each of the p structural features in each of the respective optical circuits.

In some implementations, a test configuration can be arranged on a portion of an integrated circuit device, such as a photonic integrated circuit device formed using fabrication techniques such as silicon-on-insulator wafer processing techniques. Light can be coupled into the optical couplers of the test configuration from one or more light sources (e.g., lasers). Light coupled out of the optical couplers can be detected by photodetectors (e.g., photodiodes) configured to generate electrical signals from the light. The electrical signals can be processed and prepared in a form suitable for computing optical loss characteristics (e.g., converted from analog signals to digital data).

The techniques described above can be implemented using a program comprising instructions for execution on a device or module including one or more processors or other circuitry for executing the instructions. For example, the instructions can execute procedures of software or firmware that run on one or more programmed or programmable computing devices or modules including at least one processor and at least one data storage system (e.g., including volatile and non-volatile memory, and/or storage media). The programs may be provided on a computer-readable storage medium, such as a CD-ROM, readable by a general or special purpose programmable computer, or delivered over a communication medium such as network to a computer where it is executed. Each such program may be stored on or downloaded to a storage medium (e.g., solid state memory or media, or magnetic or optical media) readable by a computing device, for configuring and operating the device when the storage medium is read by the device to perform the procedures of the program.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

providing optical waves to each of N optical circuits, each optical circuit comprising one or more of each of p structural features, where p is an integer greater than 1, and N is greater than or equal to p+1;

measuring optical responses from each of the optical circuits, where each measured optical response depends at least in part on the optical wave provided to the respective optical circuit; and computing an optical loss associated with each of the p structural features based at least in part on an optical loss for each optical circuit that is calculated based at least in part on the optical wave provided to and the measured optical response from a respective optical circuit, and quantities of each of the p structural features in each of the respective optical circuits.

2. The method of claim 1, wherein computing the optical loss comprises:

arranging a first matrix comprising the measured optical losses from each of the optical circuits;

arranging a second matrix comprising the quantity of each of the p structural features in each of the respective optical circuits;

calculating an inverse of the second matrix;

calculating a third matrix by multiplying the inverse of the second matrix with the first matrix; and determining the optical loss associated with each of the p structural features based at least in part on the third matrix.

3. The method of claim 2, wherein the second matrix further comprises quantities associated with providing the optical waves to and measuring optical responses from each of the optical circuits.

4. The method of claim 2, wherein the inverse of the second matrix is calculated using a pseudo-inverse or Moore-Penrose inverse.

5. The method of claim 1, wherein the p structural features comprise one or more of: a length associated with an optical circuit or a quantity of bends associated with an optical circuit, a waveguide transition, an optical splitting structure, a polarization rotator splitters (PRS), a waveguide crossing, a phase shifter, or a tunable attenuator.

6. The method of claim 1, wherein an optical wave is provided within each of the optical circuits to an optical structure configured to transform and to either separate or combine modes associated with the optical wave.

7. The method of claim 6, wherein calculating an optical loss for an optical circuit is based at least in part on two or more optical waves each having TE0 fundamental modes provided to the optical circuit.

8. The method of claim 1, wherein calculating an optical loss for an optical circuit is based at least in part on two or more optical waves provided to the optical circuit and two or more optical waves received from the optical circuit.

9. The method of claim 1, wherein a first optical wave is provided to each optical circuit by a respective first optical coupler, a second optical wave is provided to each optical circuit by a respective second optical coupler, a third optical wave is received from each optical circuit by a respective third optical coupler, and a fourth optical wave is received from each optical circuit by a respective fourth optical coupler.

10. The method of claim 9, wherein calculating an optical loss for each optical circuit is based at least in part on comparing the first optical wave to the third optical wave, comparing the first optical wave to the fourth optical wave, comparing the second optical wave to the third optical wave, and comparing the second optical wave to the fourth optical wave.

11. The method of claim 1, wherein calculating an optical loss of an optical circuit is based at least in part on two or more optical waves having different respective fundamental modes provided to the optical circuit.

12. The method of claim 1, wherein calculating an optical loss of an optical circuit is based at least in part two or more spectral responses associated with an optical circuit.

13. An article of manufacture comprising:

at least two optical circuits, each optical circuit comprising a first optical structure configured to transform a mode associated with an optical wave propagating through the first optical structure and combine modes associated with respective optical waves propagating through the first optical structure, a second optical structure configured to separate modes associated with an optical wave propagating through the second optical structure and transform a mode associated with an optical wave propagating through the second optical structure, a first optical coupler and a second optical coupler connected to the first optical structure, a third optical coupler and a fourth optical coupler connected to the second optical structure, and a tested optical element that is coupled to the first optical structure and the second optical structure by a respective first coupling structure and a second coupling structure;

wherein each tested optical element comprises one or more of each of two or more structural features, and respective quantities of at least two structural features are different within each optical circuit.

14. The article of manufacture of claim 13, wherein the first coupling structure and the second coupling structure are each configured to generate a TE1 mode associated with an optical wave propagating through each of coupling structures.

15. The article of manufacture of claim 13, wherein the structural features comprise one or more of: a length associated with an optical waveguiding structure, a quantity of bends associated with an optical waveguiding structure, a waveguide transition, an optical splitting structure, a polarization controller, a phase shifter, or a tunable attenuator.

16. The article of manufacture of claim 13, wherein each optical circuit further comprises a fifth optical coupler and a sixth optical coupler that are each coupled to the first coupling structure and the second coupling structure, respectively.

17. The article of manufacture of claim 16, wherein the first coupling structure and the second coupling structure are each configured as adiabatic couplers.

18. The article of manufacture of claim 13, wherein each of the first optical coupler, the second optical coupler, the third optical coupler, and the fourth optical coupler are grating couplers.

19. The article of manufacture of claim 13, wherein the first optical structure is configured to transform a TE0 mode associated with an optical wave to a TM0 mode associated with an optical wave and combine a TE0 mode associated with an optical wave with a TM0 mode associated with an optical wave and the second optical structure is configured to separate a TE0 mode associated with an optical wave from a TM0 mode associated with an optical wave and transform a TM0 mode associated with an optical wave to a TE0 mode associated with an optical wave.

20. The article of manufacture of claim 13, wherein the first optical structure is configured to transform a TE0 mode associated with an optical wave to a higher-order TE mode associated with an optical wave and combine a TE0 mode associated with an optical wave with the higher-order TE mode associated with an optical wave and the second optical structure is configured to separate a TE0 mode associated with an optical wave from a higher-order TE mode associated with an optical wave and transform the higher-order TE mode associated with an optical wave to a TE0 mode associated with an optical wave.

* * * * *